United States Patent
Pawar et al.

(10) Patent No.: US 11,115,106 B1
(45) Date of Patent: Sep. 7, 2021

(54) SELECTING BETWEEN MIMO AND CARRIER AGGREGATION

(71) Applicant: Sprint Spectrum LP, Overland Park, KS (US)

(72) Inventors: Hemanth Pawar, Brambleton, VA (US); Krishna Sitaram, Chantilly, VA (US); Shilpa Kowdley Srinivas, Brambleton, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 16/787,684

(22) Filed: Feb. 11, 2020

(51) Int. Cl.
*H04B 7/08* (2006.01)
*H04W 72/04* (2009.01)
*H04L 5/00* (2006.01)
*H04B 7/0413* (2017.01)
*H04B 1/00* (2006.01)

(52) U.S. Cl.
CPC .......... *H04B 7/0814* (2013.01); *H04B 1/005* (2013.01); *H04B 7/0413* (2013.01); *H04L 5/001* (2013.01); *H04L 5/0023* (2013.01); *H04W 72/0453* (2013.01)

(58) Field of Classification Search
CPC .... H04W 72/085; H04L 5/001; H04L 5/0023; H04B 1/0064; H04B 7/0413; H04B 1/006; H04B 7/024; H04B 7/0814; H04B 1/005

See application file for complete search history.

(56) References Cited

U.S. PATENT DOCUMENTS

| 9,860,051 | B2 | 1/2018 | Gross et al. |
| 9,900,142 | B2 | 2/2018 | Yi et al. |
| 2017/0251474 | A1* | 8/2017 | Khlat ........................ H04B 1/18 |

* cited by examiner

*Primary Examiner* — Rahel Guarino (57) ABSTRACT

Monitoring a MIMO pairing efficiency of a sector to determine whether or not to enable/disable inter-band carrier aggregation. If the pairing efficiency (whether predicted or actual) is high, inter-band carrier aggregation is disabled, and if the pairing efficiency is low, then inter-band carrier aggregation is enabled. The inter-band carrier aggregation utilizes a low-frequency carrier as a primary component carrier and a high-frequency carrier as a secondary component carrier. The MIMO mode of operation utilizes the high-frequency carrier for control transmissions.

20 Claims, 5 Drawing Sheets

SELECTING BETWEEN MIMO AND CARRIER AGGREGATION

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. Wireless networks may be configured to utilize multiple-input-multiple-output (MIMO), in which multiple data streams can be directed towards one or more eligible wireless devices via various combinations of antennae and transceivers based on the orthogonality of transmission, thereby maximizing resources. MIMO can include single-user MIMO (SU-MIMO), multi-user MIMO (MU-MIMO), and massive MIMO (mMIMO). mMIMO extends MU-MIMO to antenna arrays coupled to base stations, the antenna arrays comprising large numbers of controllable antenna elements that enable directing several MU-MIMO streams to various groups or "pairings" of wireless devices. mMIMO has been identified as one of the promising air interface technologies to address the capacity requirement required demanded by 5G networks. MIMO works better with higher frequencies, since denser amounts of data can be transmitted in multiple layers using the same frequency resources.

Further, network operators are using carrier aggregation, which enables wireless devices and access nodes to communicate using a combination of carriers, i.e. component carriers. Component carriers utilize air-interface resources (such as time-frequency resource blocks) spanning different sets of frequencies within one or more frequency bands available to use within a wireless sector. For example, a primary component carrier may utilize a first set of frequencies, and a secondary component carrier may utilize a second set of frequencies. When two or more component carriers are in the same frequency band, it is referred to as "intra-band carrier aggregation" whereas when the component carriers are parts of different frequency bands, it is referred to as "inter-band carrier aggregation." The different frequency bands may be separated by a gap, and a first frequency band may utilize much lower frequencies than a second frequency band. Wireless devices that are capable of inter-band carrier aggregation can receive and send data streams using two or more carriers using different carriers. Further, each carrier may be configured to utilize a different duplexing mode. For example, an access node configured to deploy a frequency-division-duplexing (FDD) carrier using a low frequency band, and a time-division-duplexing (TDD) carrier using a high frequency band.

However, there can be issues with attempting to use MIMO alongside inter-band carrier aggregation within the same sector. When inter-band carrier aggregation is in operation in a sector, control transmissions and data transmissions use different component carriers. For example, all control signaling for the sector may be scheduled using the lower-frequency carrier, and data transmissions may be scheduled using both lower-frequency and higher-frequency carriers. Whereas, when MIMO is in operation, control transmissions are scheduled in the same carrier as the multiple layers of data transmissions.

Overview

Exemplary embodiments described herein include methods, systems, and processing nodes for selecting between MIMO and carrier aggregation modes of operation in a wireless network. An exemplary method for selecting between MIMO and carrier aggregation includes monitoring a MIMO pairing efficiency of a sector in the wireless network, responsive to the MIMO pairing efficiency meeting a threshold, disabling inter-band carrier aggregation in the sector, the inter-band carrier aggregation utilizing a low-frequency carrier and a high-frequency carrier, and enabling a MIMO mode of operation is enabled in the sector, the MIMO mode of operation utilizing the high-frequency carrier.

An exemplary system for selecting between MIMO and carrier aggregation includes a processing node, and a processor coupled to the processing node. The processor can be configured to perform operations including determining that a predicted MIMO pairing efficiency of a sector in a wireless network meets a threshold, wherein inter-band carrier aggregation is enabled within the sector; responsive to determining that the predicted MIMO pairing efficiency meets the threshold, disabling inter-band carrier aggregation in the sector; and enabling a MIMO mode of operation within the sector. The inter-band carrier aggregation utilizes a low-frequency carrier as a primary component carrier and a high-frequency carrier as a secondary component carrier. The MIMO mode of operation utilizes the high-frequency carrier for control transmissions.

An exemplary processing node for selecting between MIMO and carrier aggregation is configured to perform operations including determining that an actual MIMO pairing efficiency of a sector in a wireless network falls below a threshold, wherein inter-band carrier aggregation is disabled within the sector, responsive to determining that the actual MIMO pairing efficiency meets the threshold, enabling inter-band carrier aggregation in the sector, and disabling a MIMO mode of operation in the sector.

DETAILED DESCRIPTION

The embodiments illustrated herein describe methods and systems whereby selecting between carrier aggregation and MIMO modes of operation is based on a pairing efficiency of wireless devices operating within a sector. If the pairing efficiency is high, the carrier aggregation mode of operation is disabled, e.g. for a period of time while wireless devices use MIMO. If the pairing efficiency is low, carrier aggregation remains enabled, until the pairing efficiency becomes high again, based on comparison with a threshold. Conversely, if MIMO is initially enabled and carrier aggregation is initially disabled, the pairing efficiency is monitored and if the pairing efficiency lowers below the threshold, carrier aggregation is enabled. These and additional operations are further described with respect to the embodiments depicted in FIGS. 1-7 below.

Figure 1:
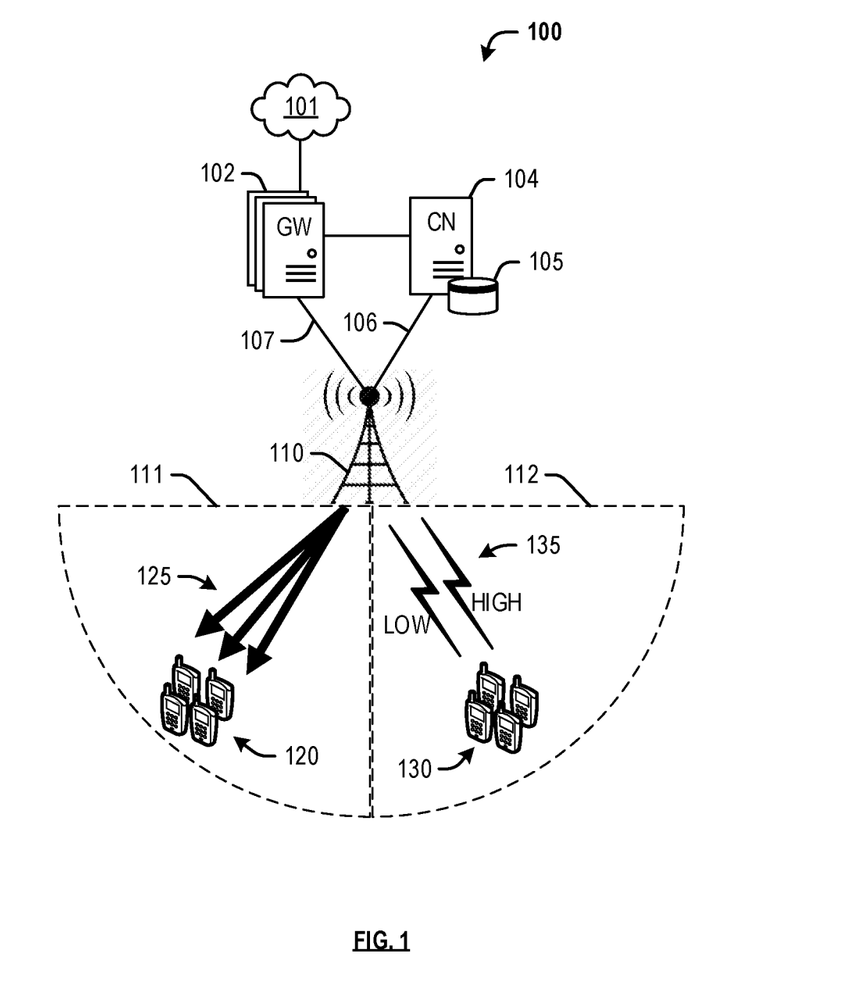
FIG. 1 depicts an exemplary system for selecting between MIMO and carrier aggregation modes of operation in a wireless network.

FIG. 1 depicts an exemplary system 100 for selecting between MIMO and carrier aggregation modes of operation in a wireless network. System 100 comprises a communication network 101, gateway node(s) 102, controller node 104, access node 110, and wireless devices 120, 130. Access node 110 can be any network node configured to provide communication between end-user wireless devices 120, 130 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 110 can be a small access node including a microcell access node, a picocell access node, a femtocell access node, or the like such as a home NodeB or a home eNodeB device. Moreover, it is noted that while access node 110 and wireless devices 120, 130 are illustrated in FIG. 1, any number of access nodes and wireless devices can be implemented within system 100.

By virtue of comprising a plurality of antennae as further described herein, access node 110 can deploy a wireless air interface across a plurality of different geographical sectors, including but not limited to sectors 111, 112. Further, the different sets of antennae can be used to deploy carriers using different frequency bands, and in different operating modes. The different frequency bands can include a first frequency band used by a first carrier, and a second frequency band used by a second carrier. The first frequency band can be lower than the second frequency band, and both frequency bands can be separated by a gap. Thus, due to the inherent properties of wavelength and frequency, MIMO transmissions are more effectively able to utilize the higher frequency bands. Therefore, the access node 110 can be configured to utilize MIMO (including SU-MIMO, MU-MIMO, mMIMO, beamforming, etc.), as well as carrier aggregation using any combination of the low-frequency and high-frequency carriers. Further in an exemplary embodiment, access node 110 is configured to deploy at least one low-frequency carrier using FDD, and at least one high-frequency carrier using TDD.

For example, a portion of antennae of access node 110 allocated towards sector 111 can be configured to transmit one or more MIMO data streams 125 to a corresponding plurality of wireless devices 120 (using, for example, a high-frequency carrier with control transmissions on the high-frequency carrier). Meanwhile, another portion of antennae of access node 110 allocated towards sector 112 can be configured to transmit data via a two component carriers 135 to wireless devices 130 using carrier aggregation. Component carriers 135 can include a high-frequency (e.g. TDD) carrier and a low-frequency (e.g. FDD) carrier. For example, the FDD carrier may be configured as the primary component carrier for control transmissions, etc., and the TDD carrier may be configured as the secondary component carrier, e.g. primarily for data transmissions (that benefit from the high frequency). Other combinations of inter-band carrier aggregation can be envisioned, such as two independent/discrete FDD bands being aggregated, or two independent/discrete TDD bands being aggregated. Intra-band carrier aggregation may also be available within sector 112.

Further, access node 110 (or any other entity within system 100) may be configured to execute a method including monitoring a MIMO pairing efficiency within each sector 111, 112 and, responsive to the MIMO pairing efficiency meeting a threshold, disabling inter-band carrier aggregation in the sector 111, 112. In the carrier aggregation mode. The MIMO pairing efficiency can be based on one or more of: a quantity of MIMO-eligible wireless devices within the sector, a potential size of MIMO groups eligible to be formed within the sector, an actual size of MIMO groups within the sector, a predicted spectral efficiency of MIMO groups within the sector, an actual spectral efficiency of MIMO groups within the sector, or historical trends of MIMO pairing efficiency within the sector. For example, wireless devices 120 (in sector 111) may qualify or be "eligible" for forming MU-MIMO groups by meeting certain "pairing" criteria. Qualifying for MIMO may be based on, for instance, an orthogonality of transmission (in other words, angular separation), so as to maximize resources of a loaded access node, as well as a total number of wireless devices allowed per MIMO group, or a size of a buffer on access node 110. In other examples, one or more criteria for pairing wireless devices 120 for MIMO (or including the wireless devices into an existing MIMO group) include a channel orthogonality (i.e., non-overlapping and non-interfering channels) above a set threshold, which may be achieved by assigning cyclic shifts allocated to, for example, a Demodulation Reference Signal ("DM-RS") to differentiate parallel data streams, as well as having a SINR above a threshold. Qualifying wireless devices may have an assigned precoder that is orthogonal to other qualifying wireless devices. In an exemplary embodiment, downlink transmission schemes of access node 110 (and/or other access nodes not shown herein) may be supported at a physical layer by a set of downlink reference signals. These reference signals can be specific to wireless devices 120, i.e., DM-RS, or specific to geographical areas of access node 110 or sector 111, i.e., Common Reference Signals ("CRS"). DM-RS' are pre-coded signals used for demodulation purposes on scheduled PRBs. For example, a pre-coding module of access node 110 may apply pre-coding to data transmissions targeted to wireless devices 120 based on channel feedback received from said wireless devices including RI, CQI, and PMI. CRS' are not pre-coded signals and are used by wireless devices 120 for channel estimation. To fully exploit MU-MIMO mode, data/spatial streams intended to/from access node 110 and/or wireless devices 120 need to be well separated and orthogonal at both Tx/Rx sides. Optimal pre-coding for MU-MIMO mode at, for example, a pre-coding module of access node 110, may include Dirty Paper Coding ("DPC") combined with user scheduling and power loading. Additional pre-coding techniques may include Channel Inversion ("CI"), e.g., to cancel interference, and/or Regularized Channel Inversion ("RCI"), e.g., to attenuate interference.

In an exemplary embodiment, a MIMO pairing efficiency metric can be generated and compared with the threshold. Generally, the performance metric can be based on one or more of a size of each MIMO group comprising the eligible wireless devices 120, a quantity of eligible wireless devices 120 participating in the MIMO groups, a percentage of total wireless devices attached to the access node 110 (including but not limited to wireless devices 120), a throughput of each of the one or more MIMO groups in the sector, an average throughput of each MIMO group or each wireless device in each MIMO group, or an aggregate throughput (i.e. total throughput) of all MIMO signals within the sector (including but not limited to MIMO signal 125). Performance metrics and/or pairing efficiency can further be based on historical and/or current information related to a quantity of successful pairings, trends of the signal characteristics, and so on. For example, the historical trends may be monitored and recorded at time intervals, and the pairing efficiency based on the recorded historical trends. Thus, at certain time intervals, the pairing efficiency is monitored when adjusting the MIMO criteria as described herein. Generally, the pairing efficiency tracks how successfully and efficiently the MIMO groups are utilizing the available resources.

If the pairing efficiency meets the threshold, then the carrier aggregation mode of operation for the sector may be disabled, which allows for the MIMO mode of operation to be implemented in the sector. The monitoring of the pairing efficiency can be performed periodically, i.e. at every time interval, and if it is determined after a time interval that the MIMO pairing efficiency falls below the threshold, then the carrier aggregation mode is enabled in the sector. In the MIMO mode of operations, control transmissions utilize the high-frequency (e.g. TDD) carrier, whereas in the inter-band carrier aggregation mode of operation, control transmissions can use the low-frequency (e.g. FDD) carrier.

In light of the above, it may be evident to those having ordinary skill in the art that the sequence of operations may differ depending on whether or not carrier aggregation is already implemented/activated within a sector. For example, determining a pairing efficiency may utilize different factors depending on whether wireless devices are able to participate in MIMO or not. In this exemplary embodiment, sector 112 is illustrated as having inter-band carrier aggregation enabled for wireless device 130. Thus, an exemplary method would include determining that a predicted MIMO pairing efficiency of wireless device 130 meets a threshold, and responsive to determining that the predicted MIMO pairing efficiency meets the threshold, disabling inter-band carrier aggregation in the sector 112. The predicted MIMO pairing efficiency can be based on one or more of: a quantity of MIMO-eligible wireless devices within the sector, a potential size of MIMO groups eligible to be formed within the sector 112, or a predicted spectral efficiency of MIMO groups within the sector, along with any other factor described above that is not dependent on MIMO having to be active at the time of determining the pairing efficiency. For example, historical trends of MIMO pairing efficiency within the sector 112 may be obtained for different times of day or other patterns, and predicted MIMO pairing efficiency determined based thereon. Subsequent to disabling the inter-band carrier aggregation, an actual MIMO pairing efficiency can be monitored.

Conversely, in this exemplary embodiment, sector 111 is illustrated as having inter-band carrier aggregation disabled (and consequently MIMO enabled) for wireless devices 120. Thus, an exemplary method would include determining that an actual MIMO pairing efficiency of sector 111 falls below a threshold and, responsive to determining that the actual MIMO pairing efficiency meets the threshold, enabling inter-band carrier aggregation in the sector 111. The actual MIMO pairing efficiency may be based on one or more of: a quantity of MIMO-eligible wireless devices 120 within the sector, an actual size of MIMO groups eligible to be formed within the sector, or an actual spectral efficiency of MIMO groups within the sector. Other factors as listed above may be considered in particular those that are measurable when MIMO is in operation, such as throughput gains, real-time performance, etc. Subsequent to disabling the inter-band carrier aggregation, a predicted MIMO pairing efficiency may be monitored, as described above. Further, the determinations of predicted/actual MIMO pairing efficiency can be performed periodically, with a time period or interval set to enable wireless devices to initialize communication and form MU-MIMO groups, etc.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 120, 130 may be any device, system, combination of devices, or other such communication platform capable of communicating wirelessly with access node 110 using one or more frequency bands deployed therefrom. Wireless devices 120, 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, 130, etc. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, Ti, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communications links 106, 107 may include Si communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR, and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to MIMO efficiency of sectors 111, 112, carrier aggregation capabilities of wireless devices 120, 130, etc. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101.

Figure 2:
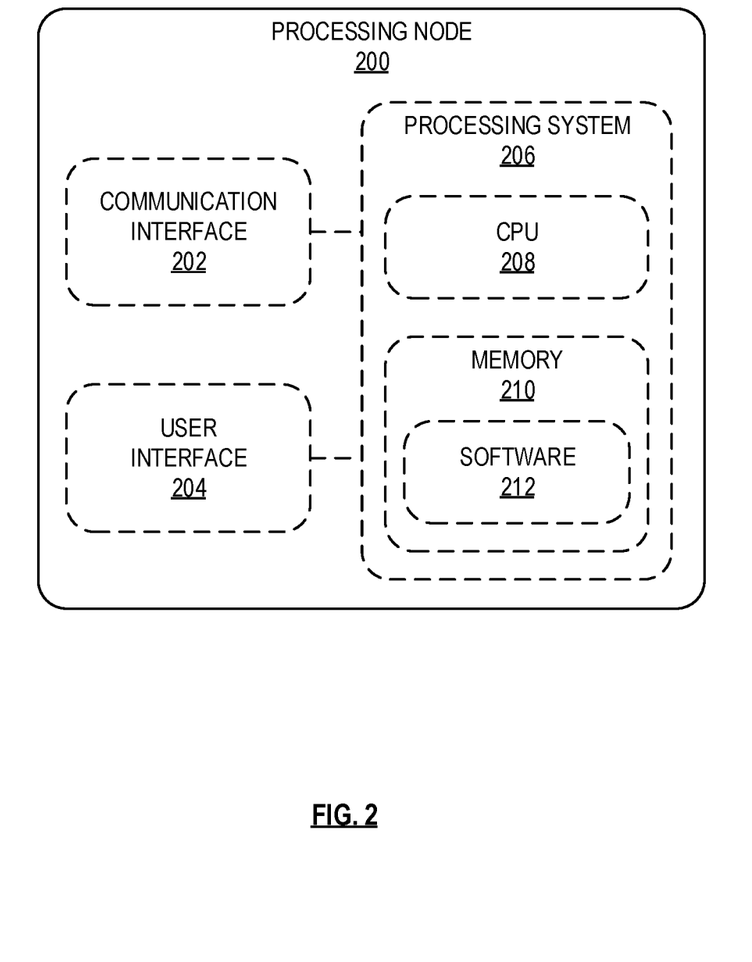
FIG. 2 depicts an exemplary processing node for selecting between MIMO and carrier aggregation modes of operation in a wireless network.

FIG. 2 depicts an exemplary processing node, comprising a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include logic for performing the operations described herein. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 212 includes logic for monitoring a MIMO pairing efficiency of a sector in the wireless network, responsive to the MIMO pairing efficiency meeting a threshold, disabling inter-band carrier aggregation in the sector, the inter-band carrier aggregation utilizing a low-frequency carrier and a high-frequency carrier, and enabling a MIMO mode of operation is enabled in the sector, the MIMO mode of operation utilizing the high-frequency carrier. In another exemplary embodiment, software 212 includes logic for determining that a predicted MIMO pairing efficiency of a sector in a wireless network meets a threshold, wherein inter-band carrier aggregation is enabled within the sector; responsive to determining that the predicted MIMO pairing efficiency meets the threshold, disabling inter-band carrier aggregation in the sector; and enabling a MIMO mode of operation within the sector. The inter-band carrier aggregation utilizes a low-frequency carrier as a primary component carrier and a high-frequency carrier as a secondary component carrier. The MIMO mode of operation utilizes the high-frequency carrier for control transmissions. In another exemplary embodiment, software 212 includes logic for determining that an actual MIMO pairing efficiency of a sector in a wireless network falls below a threshold, wherein inter-band carrier aggregation is disabled within the sector, responsive to determining that the actual MIMO pairing efficiency meets the threshold, enabling inter-band carrier aggregation in the sector, and disabling a MIMO mode of operation in the sector.

Figure 3:
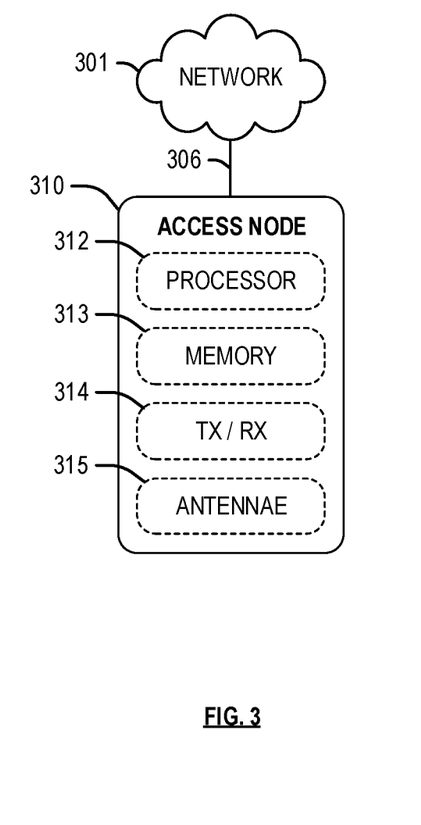
FIG. 3 depicts an exemplary access node for selecting between MIMO and carrier aggregation modes of operation in a wireless network.

FIG. 3 depicts an exemplary access node 310. Access node 310 is configured as an access point for providing network services from network 301 to end-user wireless devices such as wireless devices 120, 130 in FIG. 1. Access node 310 is illustrated as comprising a memory 313 for storing logical modules that perform operations described herein, a processor 312 for executing the logical modules, and a transceiver 314 for transmitting and receiving signals via antennae 315. Combination of antennae 315 and transceiver 314 are configured to deploy a radio air interface in one or more sectors. For example, the radio air interface can comprise at least two different carriers, each using a different frequency band. Further, in each sector, the antennae 315 may be configured to operate in various operating modes (or transmit data in various transmission mode), such as MIMO (including SU-MIMO, MU-MIMO, and massive MIMO), beamforming, carrier aggregation, etc. Similarly, transceivers 314 include a plurality of transceivers that can deploy MIMO (and massive MIMO) data streams to end-user wireless devices using 4G, 5G, etc., as well as to facilitate communication with other network nodes on network 301. Further, access node 310 is communicatively coupled to network 301 via communication interface 306, which may be any wired or wireless link as described above.

In an exemplary embodiment, memory 313 includes logic for monitoring a MIMO pairing efficiency of a sector in the wireless network, responsive to the MIMO pairing efficiency meeting a threshold, disabling inter-band carrier aggregation in the sector, the inter-band carrier aggregation utilizing a low-frequency carrier and a high-frequency carrier, and enabling a MIMO mode of operation is enabled in the sector, the MIMO mode of operation utilizing the high-frequency carrier. In another exemplary embodiment, memory 313 includes logic for determining that a predicted MIMO pairing efficiency of a sector in a wireless network meets a threshold, wherein inter-band carrier aggregation is enabled within the sector; responsive to determining that the predicted MIMO pairing efficiency meets the threshold, disabling inter-band carrier aggregation in the sector; and enabling a MIMO mode of operation within the sector. The inter-band carrier aggregation utilizes a low-frequency carrier as a primary component carrier and a high-frequency carrier as a secondary component carrier. The MIMO mode of operation utilizes the high-frequency carrier for control transmissions. In another exemplary embodiment, memory 313 includes logic for determining that an actual MIMO pairing efficiency of a sector in a wireless network falls below a threshold, wherein inter-band carrier aggregation is disabled within the sector, responsive to determining that the actual MIMO pairing efficiency meets the threshold, enabling inter-band carrier aggregation in the sector, and disabling a MIMO mode of operation in the sector.

Figure 4:
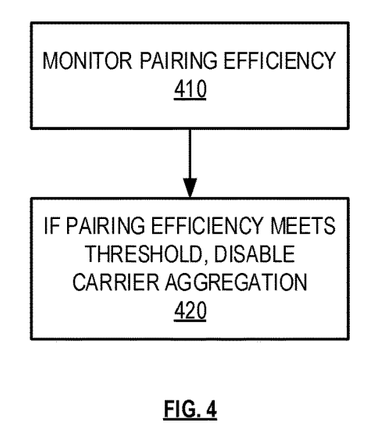
FIG. 4 depicts an exemplary method for selecting between MIMO and carrier aggregation modes of operation in a wireless network.

FIG. 4 depicts an exemplary method for selecting between MIMO and carrier aggregation in a wireless network. The method of FIG. 4 is illustrated with respect to an access node, such as access node 110, 310, or a processing node, such as processing node 200. In other embodiments, the method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, a MIMO pairing efficiency is monitored for wireless devices within a sector. For example, a wireless network can include an access node configured to provide network access to one or more end-user wireless devices and can include a plurality of antennae to implement various transmission modes or operating modes within its coverage area, including MIMO, MU-MIMO, SU-MIMO, and massive MIMO. The wireless devices attached to the access node (or a sector thereof) can be "paired" or participate in a MIMO group by virtue of meeting one or more pairing criteria, such as an orthogonality of transmission or angular separation, a total number of wireless devices allowed per MIMO group, a minimum number of eligible wireless devices required to form a MIMO group, or a size of a downlink buffer on the access node. Thus, determining that the pairing efficiency is low can be based on one or more of a size of each MIMO group comprising the eligible wireless devices, a quantity of eligible wireless devices participating in the MIMO groups, a percentage of total wireless devices attached to the access node, a throughput of each of the one or more MIMO groups in the sector, an average throughput of each MIMO group or each wireless device in each MIMO group, or an aggregate throughput (i.e. total throughput) of all MIMO signals within the sector. Performance metrics and/or pairing efficiency can further be based on historical and/or current information related to a quantity of successful pairings, trends of the signal characteristics, and so on. For example, the historical trends may be monitored and recorded at time intervals, and the pairing efficiency based on the recorded historical trends. Thus, at certain time intervals, the pairing efficiency is monitored when adjusting the MIMO criteria as described herein. Generally, the pairing efficiency tracks how successfully and efficiently the MIMO groups are utilizing the available resources.

As described above, carrier aggregation may prevent MIMO from being used within a sector. Thus, at 420, upon determining that the pairing efficiency meets a minimum threshold, carrier aggregation can be disabled to allow more MIMO transmissions to be enabled in the sector. Disabling carrier aggregation can include instructing an access node deploying the sector (and/or wireless devices attached to the access node) to attach to a specified carrier and utilize MIMO as provided within the specified carrier. For example, after carrier aggregation (utilizing the low-frequency carrier as a primary carrier) is disabled, the MIMO mode of operation may utilize the high-frequency carrier for both control and data transmissions.

Figure 5:
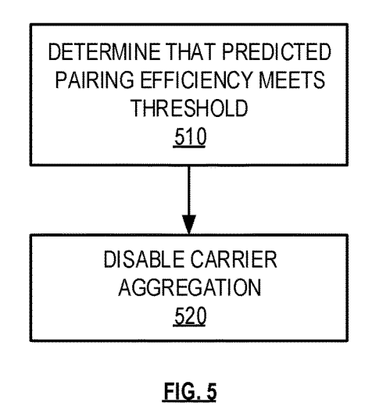
FIG. 5 depicts another exemplary method for selecting between MIMO and carrier aggregation modes of operation in a wireless network.

FIG. 5 depicts another exemplary method for selecting between MIMO and carrier aggregation in a wireless network. The method of FIG. 5 is illustrated with respect to an access node, such as access node 110, 310, or a processing node, such as processing node 200. In other embodiments, the method can be implemented with any suitable network element. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, it is determined that a predicted pairing efficiency meets a threshold. For example, a sector may be configured to utilize inter-band carrier aggregation for wireless devices within the sector, which may render MIMO inoperable. Thus, a predicted pairing efficiency is determined and compared with a threshold prior to determining whether or not to disable carrier aggregation. The predicted MIMO pairing efficiency can be based on one or more of: a quantity of MIMO-eligible wireless devices within the sector, a potential size of MIMO groups eligible to be formed within the sector, or a predicted spectral efficiency of MIMO groups within the sector, along with any other factor described above that is not dependent on MIMO having to be active at the time of determining the pairing efficiency. For example, historical trends of MIMO pairing efficiency within the sector may be obtained for different times of day or other patterns, and predicted MIMO pairing efficiency determined based thereon. Subsequent to disabling the inter-band carrier aggregation at 520, an actual MIMO pairing efficiency can be monitored.

Figure 6:
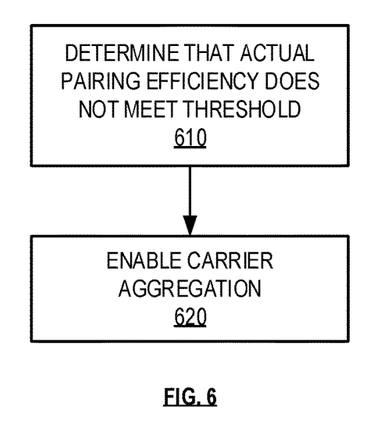
FIG. 6 depicts another exemplary method for selecting between MIMO and carrier aggregation modes of operation in a wireless network.

FIG. 6 depicts another exemplary method for selecting between MIMO and carrier aggregation in a wireless network. The method of FIG. 6 is illustrated with respect to an access node, such as access node 110, 310, or a processing node, such as processing node 200. In other embodiments, the method can be implemented with any suitable network element. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 610, it is determined that an actual pairing efficiency does not meet a threshold. For example, a sector may be configured to have already disabled inter-band carrier aggregation (and consequently MIMO enabled) for wireless devices operating within the sector. The actual MIMO pairing efficiency may be based on one or more of: a quantity of MIMO-eligible wireless devices within the sector, an actual size of MIMO groups eligible to be formed within the sector, or an actual spectral efficiency of MIMO groups within the sector. Other factors as listed above may be considered in particular those that are measurable when MIMO is in operation, such as throughput gains, real-time performance, etc. Subsequent to disabling the inter-band carrier aggregation, a predicted MIMO pairing efficiency may be monitored, as described above. Further, the determinations of predicted/actual MIMO pairing efficiency can be performed periodically, with a time period or interval set to enable wireless devices to initialize communication and form MU-MIMO groups, etc. Upon carrier aggregation being enabled at 620, a predicted pairing efficiency may be periodically determined, as described with reference to FIG. 5.

Figure 7:
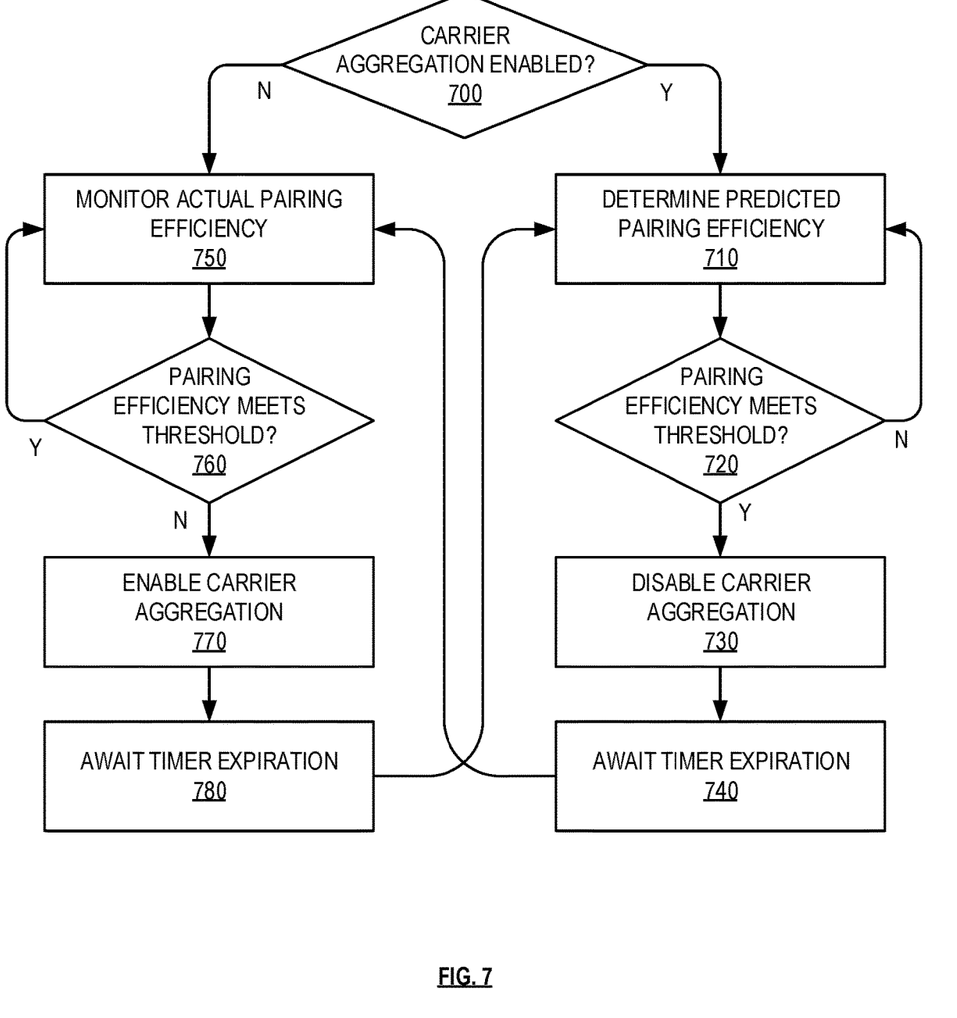
FIG. 7 depicts another exemplary method for selecting between MIMO and carrier aggregation modes of operation in a wireless network.

FIG. 7 depicts another exemplary method for selecting between MIMO and carrier aggregation in a wireless network. The method of FIG. 7 is illustrated with respect to an access node, such as access node 110, 310, or a processing node, such as processing node 200. In other embodiments, the method can be implemented with any suitable network element. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 700, it is determined whether or not carrier aggregation is currently enabled in the wireless network. For example, it may be evident to those having ordinary skill in the art that the sequence of operations may differ depending on whether or not carrier aggregation is already implemented/activated within a sector. Further, determining a pairing efficiency may utilize different factors depending on whether wireless devices are able to participate in MIMO or not. Thus, if it is determined that carrier aggregation is enabled, then at 710 a predicted pairing efficiency is obtained and compared with a threshold at 720. For example, utilizing inter-band carrier aggregation may render MIMO inoperable. Thus, the predicted MIMO pairing efficiency can be based on one or more of: a quantity of MIMO-eligible wireless devices within the sector, a potential size of MIMO groups eligible to be formed within the sector, or a predicted spectral efficiency of MIMO groups within the sector, along with any other factor described above that is not dependent on MIMO having to be active at the time of determining the pairing efficiency. For example, historical trends of MIMO pairing efficiency within the sector may be obtained for different times of day or other patterns, and predicted MIMO pairing efficiency determined based thereon. The carrier aggregation can be disabled at 730 and a timer is initiated at 740.

Subsequent to disabling the inter-band carrier aggregation at 740, an actual MIMO pairing efficiency can be monitored at 750. Since inter-band carrier aggregation is disabled at 730 (and consequently MIMO enabled) for wireless devices operating within the sector, the actual MIMO pairing efficiency may be based on one or more of: a quantity of MIMO-eligible wireless devices within the sector, an actual size of MIMO groups eligible to be formed within the sector, or an actual spectral efficiency of MIMO groups within the sector. Other factors as listed above may be considered in particular those that are measurable when MIMO is in operation, such as throughput gains, real-time performance, etc. The actual pairing efficiency is compared with a threshold at 760, and if the actual pairing efficiency does not meet the threshold (or falls below the threshold based on continuous/periodic monitoring at 750), then the carrier aggregation is enabled at 770. Subsequent to enabling inter-band carrier aggregation, and expiration of a timer at 780, a predicted MIMO pairing efficiency may be monitored at 710, as described above.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for selecting between multiple-input-multiple-output (MIMO) and carrier aggregation modes of operation in a wireless network, the method comprising:
    monitoring a MIMO pairing efficiency of a sector in the wireless network;
    responsive to the MIMO pairing efficiency meeting a threshold, disabling inter-band carrier aggregation in the sector, the inter-band carrier aggregation utilizing a low-frequency carrier and a high-frequency carrier; and
    enabling the MIMO mode of operation in the sector, the MIMO mode of operation utilizing the high-frequency carrier.

2. The method of claim 1, wherein the MIMO pairing efficiency is based on one or more of: a quantity of MIMO-eligible wireless devices within the sector, a potential size of MIMO groups eligible to be formed within the sector, an actual size of MIMO groups within the sector, a predicted spectral efficiency of MIMO groups within the sector, an actual spectral efficiency of MIMO groups within the sector, or historical trends of MIMO pairing efficiency within the sector.

3. The method of claim 2, further comprising generating a MIMO pairing efficiency metric, and comparing the MIMO pairing efficiency metric to the threshold.

4. The method of claim 1, wherein in the inter-band carrier aggregation, control transmissions use the low-frequency carrier and, in the MIMO operating mode, control transmissions use the high-frequency carrier.

5. The method of claim 1, wherein the monitoring the MIMO pairing efficiency is performed periodically.

6. The method of claim 5, further comprising determining, after a time period, that the MIMO pairing efficiency falls below the threshold; and enabling inter-band carrier aggregation in the sector.

7. A system for selecting between multiple-input-multiple-output (MIMO) and carrier aggregation modes of operation in a wireless network, the system comprising:
    a processing node; and
    a processor coupled to the processing node, the processor configured to perform operations comprising:
        determining that a predicted MIMO pairing efficiency of a sector in the wireless network meets a threshold, wherein inter-band carrier aggregation is enabled within the sector;
        responsive to determining that the predicted MIMO pairing efficiency meets the threshold, disabling inter-band carrier aggregation in the sector; and
        enabling the MIMO mode of operation within the sector.

8. The system of claim 7, wherein the inter-band carrier aggregation utilizes a low-frequency carrier as a primary component carrier and a high-frequency carrier as a secondary component carrier.

9. The system of claim 8, wherein the MIMO mode of operation utilizes the high-frequency carrier for control transmissions.

10. The system of claim 7, wherein the predicted MIMO pairing efficiency is based on one or more of: a quantity of MIMO-eligible wireless devices within the sector, a potential size of MIMO groups eligible to be formed within the sector, or a predicted spectral efficiency of MIMO groups within the sector.

11. The system of claim 7, wherein the operations further comprise, subsequent to disabling the inter-band carrier aggregation, monitoring an actual MIMO pairing efficiency in the sector.

12. The system of claim 11, wherein the actual MIMO pairing efficiency is based on one or more of: a quantity of MIMO-eligible wireless devices within the sector, an actual size of MIMO groups eligible to be formed within the sector, or an actual spectral efficiency of MIMO groups within the sector.

13. The system of claim 11, wherein the operations further comprise determining that the actual MIMO pairing efficiency falls below the threshold; and enabling inter-band carrier aggregation in the sector.

14. A processing node for selecting between multiple-input-multiple-output (MIMO) and carrier aggregation modes of operation in a wireless network, the processing node being configured to perform operations comprising:
    determining that an actual MIMO pairing efficiency of a sector in the wireless network falls below a threshold, wherein inter-band carrier aggregation is disabled within the sector;
    responsive to determining that the actual MIMO pairing efficiency meets the threshold, enabling inter-band carrier aggregation in the sector; and
    disabling the MIMO mode of operation in the sector.

15. The processing node of claim 14, wherein the inter-band carrier aggregation utilizes a low-frequency carrier as a primary component carrier and a high-frequency carrier as a secondary component carrier.

16. The processing node of claim 14, wherein the actual MIMO pairing efficiency is based on one or more of: a quantity of MIMO-eligible wireless devices within the sector, an actual size of MIMO groups eligible to be formed within the sector, or an actual spectral efficiency of MIMO groups within the sector.

17. The processing node of claim 14, wherein the operations further comprise, subsequent to disabling the inter-band carrier aggregation, determining a predicted MIMO pairing efficiency in the sector.

18. The processing node of claim 17, wherein the predicted MIMO pairing efficiency is based on one or more of: a quantity of MIMO-eligible wireless devices within the sector, a potential size of MIMO groups eligible to be formed within the sector, or a predicted spectral efficiency of MIMO groups within the sector.

19. The processing node of claim 17, wherein the operations further comprise determining that the predicted MIMO pairing efficiency is below the threshold; and enabling inter-band carrier aggregation in the sector.

20. The processing node of claim 17, wherein the predicted and actual MIMO pairing efficiency is monitored periodically.

\* \* \* \* \*